United States Patent

Derleth

[15] 3,669,501
[45] June 13, 1972

[54] VEHICLE WHEEL CONSTRUCTION
[72] Inventor: Robert J. Derleth, Lansing, Mich.
[73] Assignee: Motor Wheel Corporation, Lansing, Mich.
[22] Filed: March 3, 1970
[21] Appl. No.: 16,254

Related U.S. Application Data

[63] Continuation of Ser. No. 735,157, June 6, 1968, abandoned.

[52] U.S. Cl. ................... 301/37 R, 156/78, 260/77.5 A, 264/45, 301/37 P, 301/63 R
[51] Int. Cl. ................... B60b 3/00, B60b 7/00
[58] Field of Search ........... 301/37; 295/7; 260/77.5 AX, 260/77.5 A; 293/71; 267/153; 264/45; 156/78, 79; 29/159–159.03

[56] References Cited

UNITED STATES PATENTS

| | | | |
|---|---|---|---|
| 3,099,490 | 7/1963 | Ellison | 29/159.0 |
| 3,348,597 | 10/1967 | Goldberg | 152/323 |
| 3,356,421 | 12/1967 | Trevarrow | 301/37 |
| 3,383,152 | 5/1968 | Ward | 350/61 |
| 3,493,257 | 2/1970 | Fitzgerald | 293/71 R |
| 3,517,968 | 6/1970 | Tully | 301/37 RT |
| 3,343,770 | 9/1967 | Szonn | 267/153 X |
| 3,440,086 | 4/1969 | Kerns | 260/77.5 X |
| 3,348,597 | 10/1967 | Goldberg | 152/323 |
| 2,895,175 | 7/1959 | Reuter | 18/59 |
| 2,977,151 | 3/1961 | Ford | 301/37 ST |
| 3,062,254 | 11/1962 | Keefe | 301/63 PW X |

FOREIGN PATENTS OR APPLICATIONS

| | | | |
|---|---|---|---|
| 978,100 | 11/1950 | France | 301/37 RT |
| 424,701 | 2/1935 | Great Britain | 295/7 |
| 1,805 | 1911 | Great Britain | |
| 793,465 | 4/1958 | Great Britain | |

OTHER PUBLICATIONS

The Rolling Showcase for Engineering Plastics– Published for Mobay Chemical Co., Pittsburgh, Pa. 1968

*Primary Examiner*—Richard J. Johnson
*Attorney*—Barnes, Kisselle, Raisch & Choate

[57] ABSTRACT

A vehicle disc wheel construction wherein at least a portion of the outboard face of the disc and/or rim of a conventional steel disc wheel is covered by an ornamental plastic wheel cover. The cover has its inner and outer margins in contact with the wheel but intermediate its margins the cover is spaced outwardly from the outboard face of the wheel. The void between the cover and wheel face is filled by a low density adhesive material such as polyurethane foam which adherently secures the cover permanently to the wheel.

18 Claims, 4 Drawing Figures

PATENTED JUN 13 1972

INVENTOR.
ROBERT J. DERLETH
BY
Barnes, Kisselle, Raisch & Choate
ATTORNEYS

INVENTOR
ROBERT J. DERLETH

BY
Barnes, Kisselle, Raisch & Choate

ATTORNEYS

VEHICLE WHEEL CONSTRUCTION

This is a continuation of Ser. No. 735,157, filed June 6, 1968, and now abandoned.

An object of the present invention is to provide an automotive type wheel in which metallic parts of simple, conventional configuration, for which manufacturing equipment is already available, are utilized as the basic structural components to thereby obtain a high strength standardized wheel construction at minimum cost, but which also has an aesthetically pleasing appearance imparted by an ornamental plastic cover secured by an adhesive foam body to the outboard side of the wheel, thereby obtaining improved anti-noise characteristics and enabling the appearance of the wheel to be readily and economically varied to suit different customer's styling requirements without varying the basic structural components of the wheel construction.

A further object is to provide an improved method of making a composite wheel of the above character in an economical and reliable manner.

Other objects as well as the features and advantages of the present invention will become apparent from the following detailed description taken in conjunction with the accompanying drawings wherein.

Figure 1:
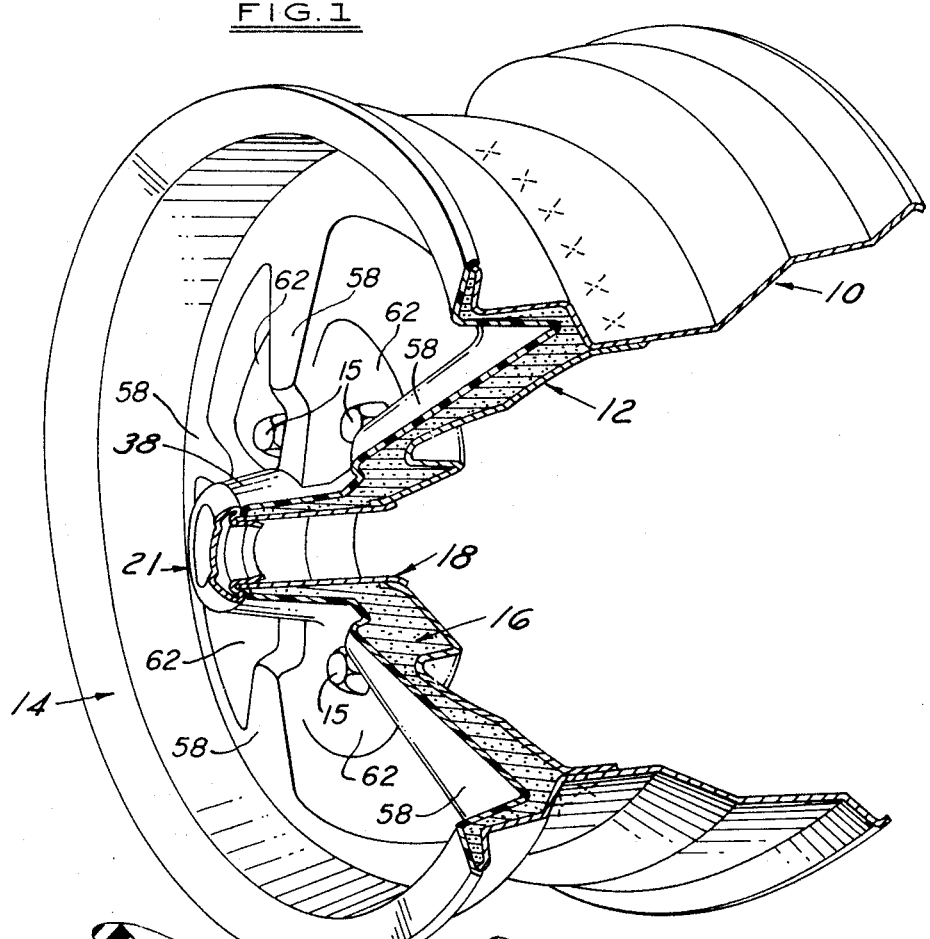
FIG. 1 is a perspective view of a composite wheel constructed in accordance with the present invention with a pie-shaped portion thereof cut out to better illustrate the sandwich-type construction characteristic of the invention.
Figure 2:
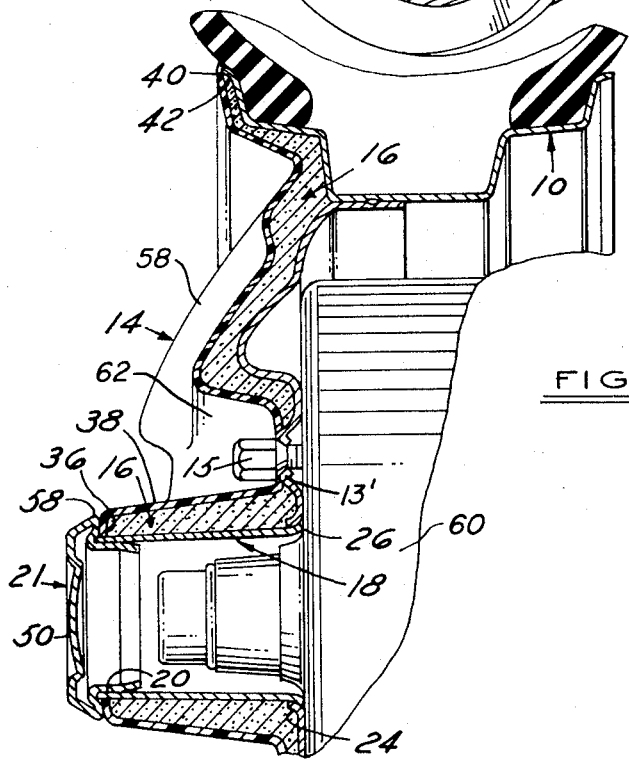
FIG. 2 is a vertical sectional view of the wheel construction of FIG. 1 and additionally showing a portion of a tubeless tire mounted on the rim and with the wheel mounted to a brake drum and rear axle hub.
Figure 3:
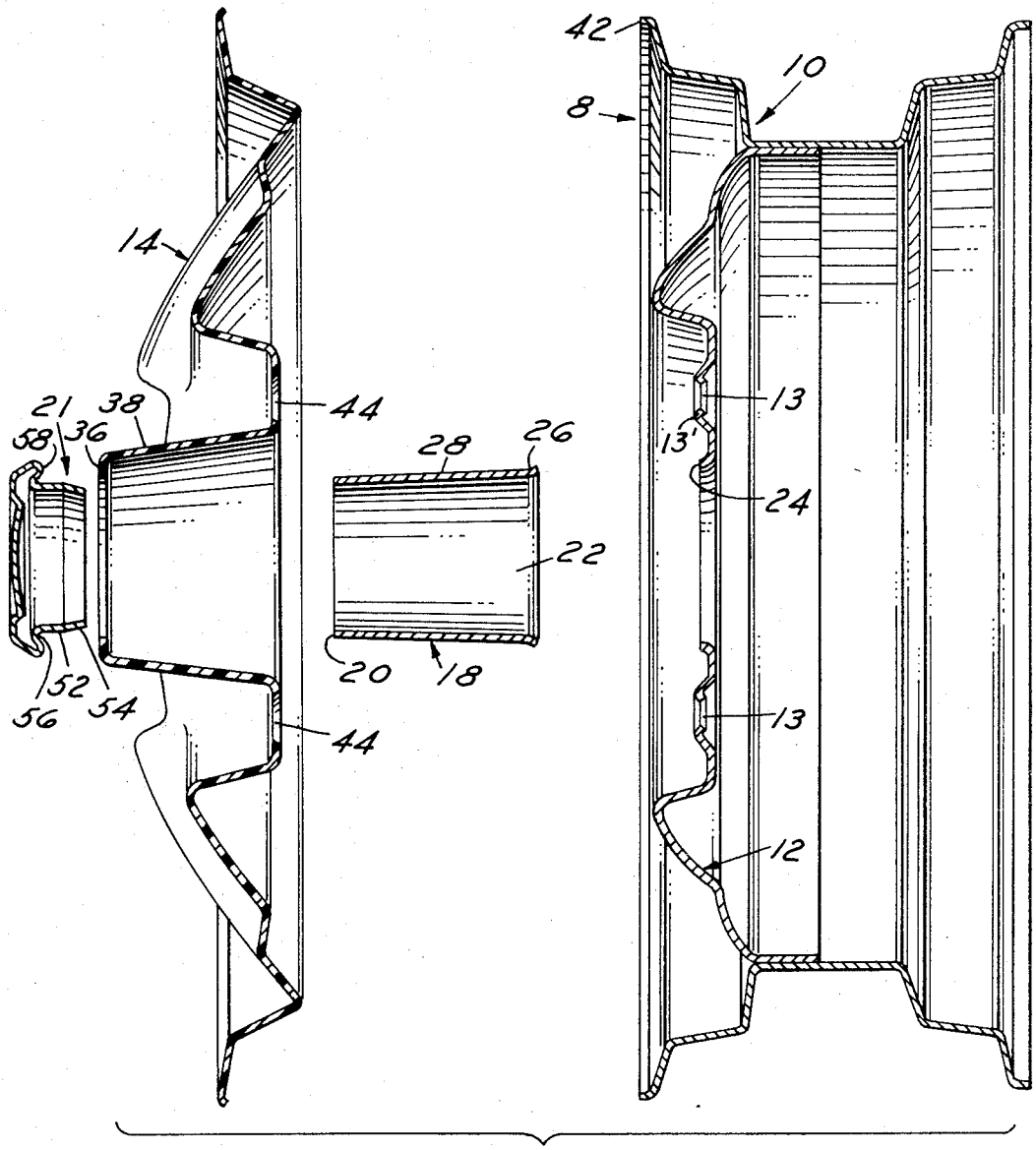
FIG. 3 is an exploded vertical sectional view illustrating the cover and center hub cover dissociated from the wheel rim and disc sub-assembly.

Referring in more detail to FIGS. 1, 2 and 3 the composite wheel of the present invention includes a conventional automotive type steel wheel 8 (FIG. 3) comprising a conventional tire-receiving rim 10 suitably secured by welding to the outer periphery of a disc or body 12. An ornamental cover 14, preferably made of readily formable thermo-plastic material and dimensioned to cover all or part of the exterior or outboard face of the wheel, is permanently bonded to the wheel by a body 16 of adhesive material (FIGS. 1 and 2) such as a polyurethane foam disposed in the space between cover 14 and the outboard faces of disc 12 and rim 10. In addition to serving as an adhesive, the body 16 of foam filling provides a low density, semi-resilient reinforcement for the thin gauge cover 14. Due to the sound insulating qualities of the solidified foam, it also provides a "sound sink" which absorbs tire and wind noises produced by the fan configuration of the wheel cover when the wheel is in motion.

Disc 12 is preferably made of relatively heavy gauge steel in a conventional multi-stage sheet blanking and stamping operation. However in accordance with the present invention, disc 12 may be made in a very simple form best adapted to serve its primary function as the principle support between the tire and the vehicle axle, without regard for its aesthetic appearance. Also, no additional structure is required for attaching the conventional removable wheel cover, further simplyfing the contour and configuration of the disc 12. However, if desired existing and somewhat more complicated disc configurations can be used for which production tooling already exists, disc 12 shown here being of the latter type. Preferably disc 12 is imperforate except for holes 13 which receive the usual wheel mounting members such as bolts, studs and/or nuts 15.

One important feature of the present invention is that deep third dimensional contours, which today are desired to impart ornamentation to the wheel, are formed principally in the easily formed plastic cover 14. Preferably cover 14 is made of high-impact resistant plastic material such as acrylonitrile-butadiene-styrene polymers, commonly referred to as ABS polymers, such as those sold under the trade mark Cycolac by Marbon Chemical Division of Borg-Warner. By using such material, cover 14 is much cheaper to mold by well-known vacuum forming processes to any desired configuration than would be the case if such configuration were to be imparted to steel disc 12. In fact the cover can be molded to configurations which are not possible in the heavy gauge steel required for disc 12. Hence the designer is given much greater latitude in creating aesthetic designs for the exterior side of the wheel. The composite wheel of the present invention is no more expensive than a standard wheel with an ordinary wheel cover removably attached thereto, and yet it eliminates problems of theft and rattling associated with such removable covers.

The presently preferred method of making a composite wheel of the present invention is as follows:

An automotive-type steel wheel 8 is made by conventional manufacturing techniques well understood in the art and hence not described in detail herein to provide the sub-assembly 8 made up of rim 10 welded to disc 12 as shown on the right hand side of the exploded view of FIG. 3.

When disc 12 does not have an integral hub sleeve, as is the case with disc 12 illustrated herein, a sleeve 18 is attached to disc 12 prior to the hereinafter described step of attaching cover 14 to the wheel in order to provide a barrier which keeps the foam material 16 out of the hub cavity of the wheel. Sleeve 18 is preferably formed from steel with its outer end 20 closed by a separate hub cap 21. The inner end 22 of sleeve 18 is open to receive the hub or spindle of the axle on which wheel 8 is mounted. Preferably the margin of the center hole of disc 12 is flared outwardly to provide an outwardly directed flange 24, and a complimentary flange 26 is formed at the open end 22 of sleeve 18 which has an outside diameter slightly greater than the minimum inside diameter of flange 24. The main body portion 28 of sleeve 18 is slightly frusto-conical and tapers to a smaller diameter toward outer end 20 to facilitate insertion of sleeve 18 outer-end-first axially through the center hole of disc 12 from the inboard side of the disc. The end 20 is designed to fit snugly in and expand by a very small amount the inwardly tapering slightly resilient end flange 36 of a frusto-conical hub portion 38 of cover 14 when sleeve 18 is inserted axially through hub portion 38 during assembly of these parts from their relative positions shown in FIG. 3 to the assembled positions thereof as shown in FIG. 2. When thus assembled, flange 36 frictionally grips and bears resiliently against the periphery of sleeve 18 to seal this joint temporarily and to also hold flange 26 temporarily in sealed contact with flange 24 of disc 12. A sealed annular cavity is thus formed between sleeve 18 and hub portion 38 which communicates with the surrounding annular cavity or void disposed radially outwardly thereof which is formed between the remainder of cover 14 and the outboard faces of disc 12 and rim 10.

Hub cap 21 comprises a sheet metal or plastic member closed at one end by a wall 50 suitably recessed to receive a medallion or other conventional decorative trim piece. Cap 21 has a skirt portion 52 which terminates in an inwardly tapering frusto-conical nose 54 which facilitates insertion of cap 21 nose-first into the outer end 20 of sleeve 18 as shown in FIG. 2. Preferably cap 21 has a reentrant groove 56 between skirt 52 and a rim 58 of the cap adapted to snugly receive the outer edge of sleeve 18 therein when rim 58 butts against flange 36 of the hub portion 38 of cover 14. If desired, skirt 52 may be dimensioned to slightly expand the outer end of sleeve 18 so that cap 21 is retained on the sleeve by a friction fit. The abutment of rim 58 against flange 36 also assists in sealing against leakage of foam from the aforementioned annular cavity or void.

Cover 14 is preferably designed to cover the entire outboard face of wheel 8 and is contoured or configurated as desired to provide a pleasing ornamental or aesthetic appearance. The inner and outer margins of cover 14 are dimensioned to have continuous contact with subjacent portions of wheel 8. As illustrated herein this is accomplished by seating of flange 36 against sleeve 18, and by contact of an overhanging peripheral flange 40 of cover 14 against the axially directed flange 42 forming the usual tire-retaining portion of rim 10 (FIG. 2).

Cover 14 is preferably made from the aforementioned thermo-plastic resin and is vacuum formed on a suitably contoured thermo-forming mold which has minute perforations in the low areas of the mold and is connected at its back to source of vacuum. A sheet of the Cycolac material is placed over the mold, heated to 300° F., and then a vacuum is drawn in the space between the sheet and mold to thereby suck the sheet against the mold surface and thus impart the mold contour to the plastic sheet. The part is cooled on the mold, then stripped from the mold and trimmed. If desired, other plastic molding processes such as injection molding may be employed.

Preferably cover 14 is chrome-plated on the outboard or exterior side thereof by a known plastic chrome plating process. For example, the cover may be first placed in an electroless copper chemical bath which etches and reacts with the plastic and deposits copper compound on the surface of the cover which is capable of receiving electrolytic copper. The part is then run through a standard electroplating process to successively electroplate copper, nickel, and finally chrome on the treated areas. Other known coating processes may be employed if desired, such as vacuum metalizing, to provide whatever surface finish may be desired on the exposed areas of cover 14.

The next step in the manufacture of the wheel construction of the present invention is to attach the chrome-plated cover 14 to the steel wheel sub-assembly 8. First sleeve 18 is inserted through disc 10 and held in the position of FIG. 2 by a suitable back-up plate or other fixture. Alternatively, sleeve may be secured in this position by tack welding flange 26 to flange 24. Then the entire exterior or outboard faces of disc 12 and rim 10, as well as sleeve 18, are coated, as by spraying or dipping, with a known foamable solution of polyurethane, liquid resin, catalyst and hardener immediately after the same have been mixed together. Cover 14 is then immediately temporarily clamped onto the wheel so that it is positioned as shown in FIG. 2 with flanges 40 and 42 in seating contact, and with sleeve 18 inserted axially through hub portion 38 so that, as described previously, flange 36 seats against sleeve 18. Cap 21 may then be inserted in the outer end of sleeve 18 as described previously. The coating solution reacts within a matter of minutes with a foam generating action, swelling up and expanding 10 to 20 times its volume to produce a polyurethane foam which completely fills the space between cover 14 and the coated faces of disc 12 and rim 10. The reaction can take place at room temperature. The coating is applied in sufficient quantity to generate an excess of foam, the excess being forced out of bolt holes 44 in cover 14 which register with bolt holes 13 in disc 12, holes 44 thus serving as relief vents for the excess reaction products. The foam is highly adhesive and thus upon curing hardens into a cellular resilient body 16 which bonds cover 14 permanently to wheel 8.

After the foam has cured, the clamps are removed and the excess foam trimmed off around the bolt holes 44.

From the foregoing description, it will now be apparent that a vehicle wheel constructed in accordance with the present invention achieves the aforestated objects of the invention. The principal structural strength is provided by a conventional assembly of a metallic rim and disc, preferably respectively rolled and stamped from steel in a simple standard configuration. Yet the wheel may have a very deep third dimensional contours in its exterior, visible side which are formed inexpensively in a wheel cover made of readily formable material, such as a high-impact resistant plastic material, which is permanently secured to the wheel by a foamable adhesive which completely fills the void between the cover and the outboard face of the wheel to thereby provide a semi-resilient reinforcement for the cover as well as a sound absorbing body of material which reduces tire and wind noises generated when the wheel is in motion. The wheel construction is readily adaptable to mass production techniques to provide a high strength wheel which is also aesthetically pleasing in appearance while offering cost savings to both the manufacturer and ultimate consumer.

Figure 4:
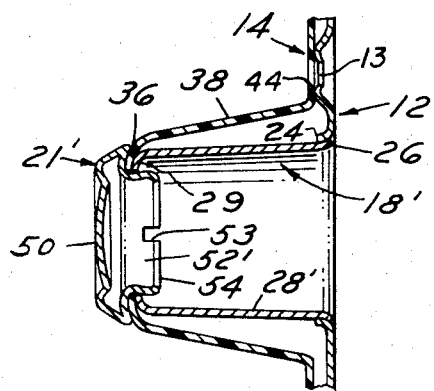
FIG. 4 is a fragmentary sectional view similar to that of FIG. 2 but illustrating a modified construction of the center portion of the wheel cover and associated hub cap and hub sleeve, also in accordance with the present invention.

FIG. 4 illustrates a modified hub sleeve and cap arrangement wherein a sleeve 18' is provided which is similar to sleeve 18 except that it has a main body portion 28' with less taper, the outer end of sleeve 18' thus being larger in diameter than outer end 20 of sleeve 18. A radially inturned flange 29 is formed on the outer end of sleeve 18 which is adapted to axially abut the inner surface of flange 36. Flanges 29 and 36 each have center openings of the same diameter. Cap 21' has a skirt 52' with circumferentially spaced notches 53 to form spring fingers 54. When cap 21' is inserted nose-first into the outer ends of hub 38 and sleeve 18', flanges 36 and 29 cam yieldable fingers 54 inwardly until the cap is fully seated as shown in FIG. 4, whereupon fingers 54 spring outwardly to retain cap 21' in this assembled position. This modified sleeve and cap arrangement is desirable when the exterior surface of hub 38 has been chrome-plated and therefore little or no flexing of portion 38 can be tolerated. With the modified arrangement, the flexing is limited to fingers 54 of the cap and yet a foam sealing mechanical joint is obtained between parts 21', 36 and 29.

As will be evident from the foregoing description, and as clearly shown in the drawings, the composite metal and plastic wheel of the invention has an ornamental plastic overlay portion 14–16, most of which comprises the elastomeric urethane portion 16, permanently adhesively secured to the outboard surface of the metal rim 10 and/or metal disc 12. As best seen in FIGS. 1 and 2, the plastic portion 14–16 illustrated by way of example herein has sections thicker axially of the wheel than the thickness of metal of disc 12 and/or rim 10. The illustrated embodiment of plastic portion 14–16 also has variations in contour in a direction transverse to the axis of the wheel (i.e., radially and/or circumferentially of the wheel) exceeding the variations in the rim and/or disc contour in a like direction. Note, for example, that portion 14–16 has five outwardly protruding spoke-simulation portions 58 with relatively sharp edges and separated by intervening dropoffs or recesses, a configuration which would be extremely difficult and expensive, if not impossible, to stamp or draw in disc 12. The plastic portion of the wheel has such variations in order to impart decorative contour to the outboard surface of the wheel, such contour variations being arranged as shown in a pattern having symmetry about the axis of rotation of the wheel to further enhance the beauty of the wheel, and also, of course, to achieve proper balance as is customary in wheel cover design.

Since practically all present-day automotive wheels are removably mounted on a suitable rotary vehicular part, such as a wheel hub, brake drum 60 (FIG. 2), axle or the like, the nonremovable plastic portion of the composite wheel of the invention, when constructed for such applications, is suitably apertured, as by providing apertures 44 adapted to individually register with the disc bolt holes 13 (FIGS. 2, 3 and 4), to thereby provide access from the outboard side of the wheel to disc holes 13 for mounting and demounting bolts 15 or other conventional wheel mounting members. Likewise, as mentioned previously, the urethane is trimmed off or otherwise formed around the holes so as to insure that the plastic portion 14–16 of the wheel is spaced radially outwardly of bolt holes 13, thus permitting bolts 15 to engage the metal portion of the wheel; i.e., the margin 13' of rim 12 surrounding each bolt hole 13 therein as best seen in FIG. 2. It also will be apparent from FIGS. 1, 2 and 3 that plastic portion 14–16 converges with the outer surface of disc 12 radially outwardly of holes 13 so that sufficient space exists radially around the outboard exposed portion of each bolt 15 to provide a zone of access, which, for example, may be in the form of a series of pockets 62, for manipulating bolts 15 during mounting and demounting of the wheel.

Moreover, in the example illustrated herein, the plastic portion 14–16 of the composite wheel of the invention is harder or denser adjacent its outboard surface than it is axially inwardly therefrom, which is in keeping with the previously mentioned semi-resilient reinforcement function of the urethane body 16 relative to the ABS polymer or other denser impact-resistant material employed to form the covering 14 exposed to view on the outboard side of the wheel. This relationship also enhances the ability of the plastic portion 14–16 to accept and retain a suitable decorative surface coating, such as the aforementioned plating material or the like, if such is desired.

What is claimed is:

1. A composite metal and plastic vehicle wheel including in combination a metallic portion comprising a disc for mounting and supporting said wheel on a rotary vehicular part such as a wheel hub, brake drum, axle or the like and a rim encircling and secured to said disc and adapted to demountably receive a tire thereon, and a plastic portion disposed adjacent and covering at least part of the outboard face of said metallic portion of said wheel, said plastic portion comprising a body of plastic material having inboard and outboard surfaces spaced from one another axially of said wheel with said inboard surface disposed adjacent and having the same contour as said covered part of said outboard face, the distance between said inboard and outboard surfaces axially of said wheel varying in a direction transverse to the axis of said wheel such that said outboard surface has a three-dimensional contour differing from that of said inboard surface and adapted to provide decorative contour exposed to view on the outboard side of said wheel, said plastic material of said body filling the space between said inboard and outboard surfaces, said inboard surface of said body being adhesively secured to said covered part of said outboard face whereby said plastic portion of said wheel is permanently affixed to said metallic portion of said wheel, said disc having a plurality of holes therein for receiving wheel mounting means therethrough for detachably mounting said wheel to said rotary vehicular part, said plastic portion overlying at least a portion of said disc surrounding said holes, said outboard surface of said plastic portion converging with said outboard face of said disc to define at least one access aperture registering with said disc holes, said converging surface of said plastic portion being spaced radially away from each of said disc holes to provide a zone of access thereto from the outboard side of said wheel for mounting and demounting the wheel mounting means.

2. The wheel as set forth in claim 1 wherein said plastic portion of said wheel comprises an ornamental cover having an outer surface defining said outboard surface of said plastic portion and a body of adhesive plastic material filling the space between the inner surface of said cover and said inboard surface of said plastic portion and adherently securing said cover to said metallic portion of said wheel.

3. The wheel as set forth in claim 2 wherein said rim and disc are steel, said cover is a unitary member made of thermoplastic material and said adhesive material comprises a resilient cellular foam body.

4. The wheel as set forth in claim 3 wherein said body of adhesive material comprises a foamed-in-place material.

5. The wheel as set forth in claim 4 wherein said adhesive material comprises polyurethane foam and said cover is preformed prior to assembly to said wheel from an acrylonitrile-butadiene-styrene plastic material.

6. The wheel as set forth in claim 4 wherein said cover is preformed prior to assembly to said wheel and has a corresponding series of holes registering with said disc holes to define a plurality of said access apertures in said plastic portion of said wheel, and all the space between said cover and said covered area of said outboard face of said wheel communicates with said cover holes to provide venting apertures for said adhesive material during the foaming stage thereof.

7. A composite steel and plastic styled vehicle wheel including in combination a wheel mounting disc, a rim secured to said disc adapted to demountably receive a resilient elastomer tire thereon, said disc and rim each comprising a part made as one piece from a single layer of cold worked steel, and an ornamental plastic overlay disposed adjacent the outboard faces of said disc and rim and exposed to view from the outboard side of said wheel with at least a portion of said overlay overlying a substantial portion of at least one of said faces and having sections thicker axially of said wheel than the thickness of said layer overlaid by said overlay, said sections of said overlay consisting of a body of elastomer material filling the space between the outer exposed surface of said portion of said overlay and said one face and permanently adherently securing said overlay to said one face, the outboard exposed surface of said overlay having a three-dimensional ornamental contour with variations therein in a direction transverse to the axis of said wheel exceeding that of said one face, said exposed surface contour thereby differing from that of said one face and having symmetry about the axis of rotation of said wheel to thereby impart an aesthetic appearance to the outboard side of said wheel.

8. The wheel as set forth in claim 7 wherein said elastomer material comprises a cast-in-place urethane elastomer occupying at least a major portion of the axial space between said one face and the outboard face of said overlay.

9. A wheel including in combination a wheel mounting disc, a rim secured to said disc adapted to receive a tire thereon, an ornamental cover disposed adjacent the outboard faces of said disc and rim with at least a portion of the said cover being spaced axially from at least one of said faces, and a body of adhesive material filling the space between the said portion of said cover and said one face, said material adherently securing said cover to said one face, said disc having a central aperture therein, said wheel further including a sleeve mounted in said aperture and extending axially outwardly from the outboard face of said disc, said cover having a hub portion axially receiving said sleeve therethrough and being radially spaced outwardly therefrom, the outer ends of said hub portion of said cover and said sleeve having interengaging portions providing a continuous sealed joint therebetween, the inner end of said sleeve and said disc likewise having interengaging portions forming a continuous sealed joint therebetween, said body of adhesive material also filling the space between said sleeve and said hub portion of said cover, said disc having an outwardly directed flange defining said center aperture therein, and including a cap inserted in the outer end of said sleeve to close the same, the inner end of said sleeve being open and having an outwardly flared flange at said inner end engaging said disc flange to provide said interengaging portions of said disc and sleeve, said hub portion of said cover having an inwardly directed flange at its outer end and said sleeve having a circumferential portion engaging said flange of said hub portion to provide said interengaging portions of said hub portion and said sleeve.

10. A composite metal and plastic automotive-type styled wheel including in combination a metal portion comprising a metal disc and a metal rim secured to said disc and adapted to removably receive a pneumatic tire thereon and a plastic portion covering at least part of the outboard face of said metal portion of said wheel, said plastic portion comprising a body of urethane plastic material having an inboard mounting surface complimentally contoured to said covered part of said outboard face of said metal portion, the contour of the outboard surface of said plastic portion differing from the contour of said covered part of said outboard face of said metal portion and having sections thicker than and variations in contour greater than that of said covered part of said metal portion to provide decorative configuration exposed to view on the outboard side of said wheel, said urethane plastic material of said body generally filling the space between said inboard mounting surface and an outboard surface of said body and providing at least a semi-resilient reinforcement for said plastic portion of said wheel, said plastic portion being densest adjacent said outboard surface thereof, said inboard mounting surface of said body being adhesively secured to said covered part of said outboard face whereby said plastic portion of said wheel is permanently affixed to said metal portion of said wheel.

11. A composite metal and plastic demountable automotive-type styled wheel including in combination metal members including a wheel mounting disc and a rim secured to said disc adapted to receive a resilient elastomeric tire thereon, and an ornamental plastic overlay for the outboard face of at least one of said disc and rim members with said overlay overlying at least part of one of said faces and having portions extending axially outwardly from said one face by a distance greater than the thickness of the metal of said one member, said overlay including a body of elastomer material in the space between the outer exposed surface of said overlay and said one face and adherently securing said overlay to said one face, the outboard face of said overlay having an ornamental contour differing from that of said one face and adapted to impart an aesthetic appearance to the outboard side of said wheel, said disc having a plurality of holes therein for receiving wheel mounting members therethrough, said overlay having an apertured portion extending inwardly to said one face and around said disc holes to accommodate and provide access to the wheel mounting members.

12. A composite metal and plastic demountable automotive-type styled wheel including in combination a metal portion comprising a metal disc and a metal rim secured to said disc and adapted to receive a tire thereon, and a plastic portion disposed adjacent and covering at least part of the outboard face of said metal portion of said wheel, said plastic portion comprising a body of plastic material having an inboard mounting surface complimentally contoured to the covered part of said outboard face of said metal portion, said plastic portion having sections thicker than said disc and rim and an outboard surface contour differing from the outboard face contour of said metal portion to impart a decorative configuration thereto, said disc having a plurality of holes therein for receiving wheel mounting members therethrough, said plastic portion having an apertured portion extending inwardly to said outboard face of said metal portion around said disc holes to accommodate and provide access to the wheel mounting members and to expose said disc holes from the outboard side of said wheel, said inboard mounting surface of said body being adhesively secured to said outboard face of said metal portion at said apertured portion and also radially outwardly therefrom whereby said plastic portion of said wheel is permanently affixed to said metal portion of said wheel.

13. The wheel as set forth in claim 12 wherein said body comprises a urethane plastic.

14. The wheel as set forth in claim 13 wherein said body comprises a molded-in-place material.

15. A composite metal and plastic vehicle wheel including in combination a metallic portion comprising a disc for mounting and supporting said wheel on a rotary vehicular part such as a wheel hub, brake drum, axle or the like and a rim encircling and secured to said disc and adapted to receive a tire thereon, and a plastic portion disposed adjacent and covering at least part of the outboard face of said metallic portion of said wheel, said plastic portion comprising a body of plastic material having inboard and outboard surfaces spaced from one another axially of said wheel with said inboard surface disposed adjacent and having the same contour as said covered part of said outboard face, the distance between said inboard and outboard surfaces axially of said wheel varying in a direction transverse to the axis of said wheel such that said outboard surface has a three-dimensional contour differing from that of said inboard surface and adapted to provide decorative contour exposed to view on the outboard side of said wheel, said plastic material of said body filling the space between said inboard and outboard surfaces, said inboard surface of said body being adhesively secured to said covered part of said outboard face whereby said plastic portion of said wheel is permanently affixed to said metallic portion of said wheel, said disc having a plurality of holes for receiving mounting means therethrough and said plastic portion overlying said disc and having a corresponding series of holes registering with said disc holes, said outboard surface of said plastic portion converging with said outboard face of said disc in the vicinity of said holes to provide access pockets for individually exposing said mounting means to the outboard side of said wheel, said disc having metallic means exposed at and in contact with the margin of each of said holes in said plastic portion adapted to engage said mounting means associated with each said disc hole.

16. A composite metal and plastic vehicle wheel including in combination a metallic portion comprising a disc for mounting and supporting said wheel on a rotary vehicular part such as a wheel hub, brake drum, axle or the like and a rim encircling and secured to said disc and adapted to receive a tire thereon, and a plastic portion disposed adjacent and covering at least part of the outboard face of said metallic portion of said wheel, said plastic portion comprising a body of plastic material having inboard and outboard surfaces spaced from one another axially of said wheel with said inboard surface disposed adjacent and having the same contour as said covered part of said outboard face, the distance between said inboard and outboard surfaces axially of said wheel varying in a direction transverse to the axis of said wheel such that said outboard surface has a three-dimensional contour differing from that of said inboard surface and adapted to provide decorative contour exposed to view on the outboard side of said wheel, said plastic material of said body filling the space between said inboard and outboard surfaces, said inboard surface of said body being adhesively secured to said covered part of said outboard face whereby said plastic portion of said wheel is permanently affixed to said metallic portion of said wheel, said plastic portion of said wheel comprising an ornamental plastic cover having an outer surface defining said outboard surface of said plastic portion and a body of adhesive plastic material filling the space between the inner surface of said cover and said inboard surface of said plastic portion and adherently securing said cover to said metallic portion of said wheel, said disc having a central aperture therein, said wheel further including a sleeve mounted in said disc central aperture and extending axially outwardly from the outboard face of said disc, said cover having a hub portion axially receiving said sleeve therethrough and being radially spaced outwardly therefrom, the outer ends of said hub portion of said cover and said sleeve having interengaging portions providing a continuous sealed joint therebetween, the inner end of said sleeve and said disc likewise having interengaging portions forming a continuous sealed joint therebetween, said body of adhesive material also filling the space between said sleeve and said hub portion of said cover.

17. A composite metal and plastic vehicle wheel including in combination a metallic portion comprising a disc for mounting and supporting said wheel on a rotary vehicular part such as a wheel hub, brake drum, axle or the like and a rim encircling and secured to said disc and adapted to receive a tire thereon, and a plastic portion disposed adjacent and covering at least part of the outboard face of said metallic portion of said wheel, said plastic portion comprising a body of plastic material having inboard and outboard surfaces spaced from one another axially of said wheel with said inboard surface disposed adjacent and having the same contour as said covered part of said outboard face, the distance between said inboard and outboard surfaces axially of said wheel varying in a direction transverse to the axis of said wheel such that said outboard surface has a three-dimensional contour differing from that of said inboard surface and adapted to provide decorative contour exposed to view on the outboard side of said wheel, said plastic material of said body filling the space between said inboard and outboard surfaces, said inboard surface of said body being adhesively secured to said covered part of said outboard face whereby said plastic portion of said wheel is permanently affixed to said metallic portion of said wheel, said plastic portion of said wheel comprising an ornamental plastic cover having an outer surface defining said outboard surface of said plastic portion and a body of adhesive plastic material filling the space between the inner surface of said cover and said inboard surface of said plastic portion and adherently securing said cover to said metallic portion of said wheel, said rim and disc being steel, said cover being a unitary member made of thermo-plastic material and said adhesive material comprising a resilient cellular foam body, said disc having a plurality of holes for receiving mounting bolts therethrough, said cover having a corresponding series of holes registering with said disc holes, all the space between said cover and said covered area of said outboard face of said wheel communicating with said cover holes to provide venting apertures for said adhesive material during the foaming stage thereof, said cover entirely overlying said outboard faces of said disc and said rim and being spaced from said faces except at the outer peripheral margin of said cover and in the vicinity of said disc holes, said outer peripheral margin of said cover contacting the outer margin of said rim continuously circumferentially therearound, said foam filling all of the space between said cover and said disc and rim faces.

18. A composite steel and plastic automotive wheel including in combination a wheel mounting disc, a rim secured to said disc adapted to receive a tire thereon, said disc and rim each comprising a single layer of cold worked steel, and an ornamental plastic overlay disposed adjacent the outboard faces of said disc and rim and exposed to view from the outboard side of said wheel with at least a portion of said overlay being spaced axially outwardly from and overlying at least one of said faces, said overlay including a body of elastomer material filling the space between the outer exposed surface of said portion of said overlay and said one face and adherently securing said overlay to said one face, the outboard face of said overlay having a three-dimensional ornamental contour differing from that of said one face and adapted to impart an aesthetic appearance to the outboard side of said wheel, said elastomer material comprising a cast-in-place urethane elastomer occupying at least a major portion of the axial space between said one face and the outboard face of said overlay, said one face comprising the outboard face of said disc and said disc having a central aperture therein, said wheel further including a metallic sleeve mounted in said disc aperture and extending axially outwardly from the outboard face of said disc, said plastic overlay having a hub portion encircling and axially receiving said sleeve therethrough and having an outer surface spaced radially outwardly from said sleeve, the outer end of said sleeve being disposed adjacent the outer end of said hub portion, the inner end of said sleeve and said disc having interengaging portions forming a sealed joint therebetween, said body of elastomer material filling the space between said sleeve and the outer surface of said hub portion and adherently securing said sleeve to said overlay to thereby at least in part secure said sleeve to said disc.

* * * * *

UNITED STATES PATENT OFFICE
CERTIFICATE OF CORRECTION

Patent No. 3,669,501      Dated June 13, 1972

Inventor(s) Robert J. Derleth

It is certified that error appears in the above-identified patent and that said Letters Patent are hereby corrected as shown below:

Column 5, line 59 - cancel "3" and insert --2--

Signed and sealed this 12th day of December 1972.

(SEAL)
Attest:

EDWARD M. FLETCHER, JR.
Attesting Officer

ROBERT GOTTSCHALK
Commissioner of Patents